3,333,015
DIENIC MONOMER POLYMERIZATION USING ALCOHOL-PEROXIDE CATALYST SYSTEM

Oliver W. Burke, Jr., 506 Intracoastal Drive, Fort Lauderdale, Fla. 33304, and Eldon E. Stahly, Ellicott City, Md.; said Stahly assignor to said Burke
No Drawing. Filed Nov. 19, 1963, Ser. No. 324,866
16 Claims. (Cl. 260—680)

This invention relates to the production of unsaturated liquid polymers of polymerizable conjugated diene monomers containing from 4 to 8 carbon atoms. The liquid polymers may be homopolymers or copolymers of such dienes or copolymers of a substantial proportion of one or more such dienes with one or more other copolymerizable ethylenically unsaturated monomer materials. Such liquid polymers are useful in the formation of protective coatings, inks, adhesives, etc.

Bulk polymerization of conjugated dienes with the aid or organic peroxy catalysts is difficult to control with respect to polymerization rate, removal of heat of polymerization, and molecular weight range.

The present invention aims to facilitate control of the polymerization in such respects and to provide a modified unsaturated liquid polymer by providing a new process for the production of unsaturated liquid dienic polymers characterized in that the polymerization of the dienic monomer material is effected with the aid of an organic peroxy free radical generating catalyst in homogenous mixture with lower molecular weight alcohol, e.g, alcohol containing from 1 to 6 carbon atoms, preferably 1 to 4 carbon atoms.

More particularly, the present process for forming an unsaturated liquid polymer comprises (a) forming a homogenous reaction solution containing by weight,
  (1) 100 parts polymerizable ethylenically unsaturated monomer material,
  (2) 10 to 200 parts alcohol (preferably 25 to 100 parts and most preferably 30–50 parts) and
  (3) 0.5 to 10 parts organic peroxide polymerization catalyst (preferably 1–5 parts and most preferably 2–4 parts),
(b) heating said mixture
  (1) at a temperature in the range of from above 100° to 200° C. (preferably 105 to 150° C. and most preferably 115–130° C.),
  (2) for from 10 minutes to 10 hours,
  (3) to a conversion of monomer material to polymer of at least 35%, (preferably about 50 to 75%) and,
(c) recovering the formed liquid polymer;
(d) the ethylenically unsaturated monomer material comprising by weight at least 10% (preferably 30%, most preferably from over 50% to 100%) conjugated diene monomer material containing from 4 to 8 carbon atoms, and
(e) the alcohol containing from 1 to 6 carbon atoms, and
(f) the organic peroxide polymerization catalyst containing not more than 30 carbon atoms and having a formula selected from the group consisting of R'OOR' and R'OOH, wherein R' is a hydrocarbon radical, The invention resides in the new process and in the liquid unsaturated polymers produced thereby, as herein described and exemplified, and is more particularly pointed out in the appended claims.

The conjugated diene monomers which may be employed contain and are polymerizable through a plurality of $>C=C<$ group and have from 4 to 8 carbon atoms.

These monomers preferably are selected from the group consisting of

Butadiene-1,3
Isoprene
2-methoxy-butadiene-1,3
Piperylene (pentadiene-1,3)
2,3-dimethyl-butadiene-1,3
1,1-dimethyl-butadiene-1,3
1,4-dimethyl-butadiene-1,3
The trimethyl and tetramethyl butadiene-1,3's
Chloroprene
Cyclopentadiene,
and the like.

Among the copolymerizable ethylenically unsaturated monomer materials which may be copolymerized with said diene monomers are the compounds containing and copolymerizable through an individual $>C=C<$ group, set forth in Burke et al. U.S. Patent No. 3,085,074 dated Apr. 9, 1963, at col. 5, line 60 to col. 7, line 21. Preferably these monomers are selected from the class consisting of the copolymerizable vinyl, vinylidene and allyl compounds. Particularly suitable are the copolymerizable vinylbenzenes, vinylcyanides, vinylamides, vinylpyridines, vinylpyrrolidone, halogen substituted ethylenes and propylenes, alkyl-vinyl-ethers, alkyl-vinyl-ketones; acrylic acids and their esters; vinyl acetate; allyl alcohol and its esters; and combinations of any two or more members of the foregoing. As herein used, the aforesaid terms designate the groups consisting of the members here named—

*Vinylbenzenes.*—Styrene, alpha-methylstyrene and the ring substituted styrenes and alpha-methylstyrenes having one to two $C_1$ to $C_6$ alkyl substituents, and the like.

*Vinyl cyanides.* — Acrylonitrile and methacrylonitrile and the like.

*Vinyl amides.*—Acrylamide, methacrylamide, and the mono- and di-($C_1$ to $C_6$ alkyl)-N-substituted acrylamides and methacrylamides, and the like.

*Vinyl pyridines.*—Vinyl pyridines and the ring substituted vinyl pyridines having one to two $C_1$ to $C_6$ alkyl substituents, and the like.

*Halogen substituted ethylenes and propylenes.*—Vinyl chloride, vinyl fluoride, vinylidene chloride, vinylidine fluoride, trichloroethylene, trifluorochloroethylene, and trifluoropropylene, and the like.

*Alkyl-vinyl-ethers.*—The ($C_1$ to $C_6$ alkyl)-vinyl-ethers,

*Alkyl - vinyl - ketones.*—Methylvinylketone, methylisopropenylketone, and the like.

*Acrylic acids and their esters.*—Acrylic acid, the alpha-($C_1$ to $C_6$ alkyl)-substituted acrylic acids, the beta-($C_1$ to $C_6$ alkyl)-substituted acrylic acids, and the $C_1$ to $C_{12}$ alkyl esters of these acrylic acids; and the like.

*Allyl alcohol and its esters.*—Allyl alcohol, and the mono- and di-allyl esters of $C_2$ to $C_{12}$ mono- and di-carboxylic acids, and the like.

Also among the ethylenically unsaturated monomer materials are the drying oil substances which may be interpolymerized with ethylenically unsaturated monomer materials with the aid of the organic peroxy compounds and alcohols hereof. The term drying oil substances as herein used is limited to (1) the drying oils including linseed, perilla and fish oils and especially those drying oils containing conjugated unsaturation, e.g., tung oil, oiticica oil, conjugated linseed oil, conjugated soya bean oils, dehydrated castor oil, isano oil, etc., (2) the bodied drying oils, whether from conjugated or non-conjugated oils and whether bodied by heat and/or catalytically, (3) the peroxidized drying oils, especially those blown at lower temperatures, and (4) the fatty acids and/or dimers, trimers and tetramers thereof, derived from such conjugated or bodied or blown drying oils. While the drying oil substances are not to be regarded as monomers for the purpose of forming homopolymers, they are ethylenically unsaturated monomers to the extent that they can be interpolymerized with monomers set forth above, and the term "ethylenically unsaturated" monomer material, which is generic to the conjugated dienes and the copolymerizable unsaturated monomers, is to be understood accordingly.

The organic peroxy free radical generating polymerization catalysts which may be employed include any of the organic peroxides and hydroperoxides which have heretofore been employed as polymerization initiators.

In general, two groups of organic peroxides can be used, those having the formula ROOH, known as hydroperoxides or hydroperoxymethanes, and those having the formula R'OOR', where R' in each instance is a hydrocarbon radical. The hydroperoxides can be represented by the formula RR'R"COOH wherein R is selected from the group consisting of hydrogen and hydrocarbon radicals, and each of R' and R" is a hydrocarbon radical, or R'R" together comprise a tetramethylene or pentamethylene group forming with the R—COOH a cyclopentyl- or cyclohexyl-hydroperoxide. Examples of such hydroperoxides includes diisopropyl hydroperoxide (isopropyl(dimethyl)hydroperoxymethane), cumene hydroperoxide (phenyl(dimethyl)hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl (ethoxyphenyl)hydroperoxymethane, methyldecyl (methylphenyl)hydroperoxymethane, dimethyldecyl - hydroperoxymethane, and tertiary - butylisopropylbenzene hydroperoxide (dimethyl(tertiary-butylphenyl)hydroperoxymethane).

One large group of the hydroperoxymethanes is that group in which each of the three substituent groups is a hydrocarbon radical. One of the subgroups of these compounds is the alkaryl-dialkyl hydroperoxymethanes, in which the two alkyl groups are relatively short, i.e. have from one to four carbon atoms each, including dimethyl-(tertiary-butylphenyl)hydroperoxymethane, dimethyl(diisopropylphenyl)hydroperoxymethane, dimethyl(isopropylphenyl)hydroperoxymethane, dimethyl(dodecylphenyl)hydroperoxymethane, dimethyl(methylphenyl)hydroperoxymethane, and corresponding methylethyl and diethyl compounds, and the like. Another subgroup includes at least one long alkyl group directly attached to the hydroperoxymethane, such as methyldecyl(methylphenyl)hydroperoxymethane, ethyldecylphenylhydroperoxymethane, and the like. Still another subgroup includes trialkyl compounds, such as dimethyldecylhydroperoxymethane, and the like; aralkyl compounds such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. A further subgroup comprises cyclopentyl and cyclohexyl hydroperoxides, such as result from oxidation of cyclohexane, methylcyclopentane, and phenylcyclohexane, and compounds containing condensed ring structures such as 1,2,3,4,4a,9,10,10a-octahydrophenanthrene, which forms the corresponding hydroperoxide upon oxidation, etc. The peroxides include such compounds as benzoyl peroxide, dicumyl peroxide, and di-tert-butyl peroxide. Organic peroxides and hydroperoxides preferably will have a total of not more than 30 carbon atoms per molecule. Mixtures of these peroxides and/or hydroperoxides can be used, as desired.

The organic peroxy free radical generating catalysts may be employed in the present invention in relatively pure state or as crude peroxides of sufficient concentration.

The lower molecular weight alcohols usable in accordance with the present invention are those having 1 to 6 carbon atoms, preferably the mono-hydroxy alcohols having 1 to 4 carbon atoms, and include, but are not restricted to the following: methanol, ethanol, n-propanol, isopropanol, n-butanol, sec-butanol, iso-butanol, and tert.-butanol.

These alcohols may be used individually or in combination of two or more thereof, or in mixtures with minor proportions of diluents, especially azeotropic mixtures with water and/or $C_5$ to $C_{10}$ hydrocarbon components in which the alcohol predominates, e.g., methanol/toluene 69/31; ethanol/toluene 68/32; isopropanol/toluene 69/31; n-propanol/toluene 52.5/67.5; isopropanol/water 88/12; n-butanol/water 55/45; and the like.

In accordance with the present invention the reaction materials are combined in a homogenous phase in substantially the following proportions:

| Component | Proportion, Parts by weight | | |
|---|---|---|---|
| | Range | Preferred Range | Most Preferred Range |
| Dienic monomer | 100 | 100 | 100 |
| Alcohol with or without minor proportion of diluent | 10–200 | 25–100 | 30–50 |
| Organic peroxy catalyst | 0.5–10 | 1–5 | 2–4 |

The term homogenous phase connotes that all the aforesaid components are in solution in each other. To effect the polymerization the reaction mixture is heated in the temperature range of above 100° C. to 200° C., preferably 105 to 150° C., most preferably 115 to 130° C., from 10 minutes to 10 hours to a conversion of monomer to polymer of at least about 35% and preferably about 50 to 75% followed by recovery of the formed liquid polymer.

The polymerizations at above 100° C. are carried out batchwise or continuously in suitable pressure equipment, and the present process of polymerization with organic peroxide in the presence of alcohol may be carried out conjointly with the process of copending U.S. application Ser. No. 863,218, now abandoned, employing hydrogen peroxide in the presence of alcohol. When the polymerization is carried out continuously, the homogenous reaction mixture is continuously formed and fed through a polymerization zone, and the formed liquid polymer is continuously removed from said zone. The recovery of the polymer may be effected in any suitable manner, i.e., the volatile materials such as monomer, alcohol, etc., may be vaporized and removed, and when desired the residual catalyst can be destroyed with a polymerization short stop agent. If desired, antioxidant and other modifying materials may be added before or after the removal of the volatile materials. The alcohol is readily separated from the liquid polymer, e.g., by distillation, and may be recycled.

Preparation of graft copolymers and terpolymers of conjugated dienes may be effected by the present process in a two-step or multi-step polymerization. The diene can be charged to the alcohol solution of the peroxide catalyst and partially polymerized, and then one or more additional monomers such as styrene, acrylonitrile, acrylic acid, methacrylic acid, acrylamide, and the like or mixtures of 2 or more such monomers can be charged and the polymerization is then continued to the desired conversion. This procedure yields graft copolymers which are clear and free of the cloudiness associated with incompatible polymer materials.

The dienic monomer material as herein employed comprises at least 10% of conjugated diene monomer material with not more than 90% mono-ethylenically unsaturated co-monomer material, and preferably contain from 30 to 100% conjugated diene monomer material, most preferably from at least 50% to 100% conjugated diene monomer material.

By varying the concentrations of the components and the percentages of conversion and the temperature and time of the reaction within the aforesaid range, liquid polymers may be obtained having Brookfield viscosities at 30° C. in the range of from 30 to 30,000 poises, preferably 500 to 5000 poises, and the term liquid polymers is herein used in this sense.

A further understanding of the invention may be obtained from the following specific examples, which, however, are to be taken as illustrative and not restrictive of the invention, the scope of which is pointed out in the appended claims.

*Example 1*

A two-step polymerization of butadiene with acrylic acid and styrene was conducted with 3% cumene hydroperoxide as catalyst (based on total monomers) in solution in 35 parts isopropanol per 100 parts of monomers. The reactor was a 5-gallon pressure vessel equipped with a mechanical paddle-type agitator and a circulation system for heat transfer fluid for heating up the system and also for removing heat from the reaction mixture. In the first step the charge was as follows in parts by weight:

| | |
|---|---|
| Butadiene | 70.5 |
| Methacrylic acid | 4.5 |
| Isopropanol | 35.0 |
| Cumene hydroperoxide (75%) | 4.0 |

The mixture was heated, while stirring at 600 r.p.m. and the temperature was brought to 130° C. and maintained at that temperature for 1.5 hours. After 1.5 hours, 25 parts of styrene were charged and the polymerization was continued for 1.5 hours at 130° C., making the total reaction of 3 hours duration. The polymer-alcohol-monomer mixture was then passed into a continuous film evaporator and the volatiles were stripped out at about 140° C. at less than 5 mm. mercury pressure. The conversion to polymer was 57% of the monomers charged. The polymer was water-white and had a Brookfield viscosity of 4230 poises @ 30° C. Its volatile contents by the ASTM procedure was less than 0.2%.

*Example 2*

The equipment of Example 1 was used to conduct a two-step polymerization of 73.5 parts butadiene/1.5 parts methacrylic acid/25 parts styrene with 3 parts tertiary butyl hydroperoxide in 35 parts isopropanol. All components were charged except the styrene for the first step. The temperature was brought to 130° C. in about 20 minutes while agitating efficiently and was maintained at that temperature for 1 hour; then the styrene was added and the temperature was maintained at 130° C. for an additional 1.5 hours. Stripping as in Example 1 to about 0.2% volatiles showed a recovery of terpolymer of 63% of the monomers charged with a viscosity of 1750 poises.

*Example 3*

The polymerization of Example 2 was repeated but substituting 5 parts of di-tert-butyl peroxide for the t-butyl hydroperoxide. The stripped product was obtained in 50% yield based on monomers charged at a viscosity of 4000 poises.

*Example 4*

Eight parts by weight of tert-butyl hydroperoxide in 28 parts of t-butyl alcohol were combined in a pressure bottle with 100 parts of 1,3-butadiene. The bottle was heated 2 hours at 115 to 120° C. The polymer was vacuum stripped and was obtained in 42% yield based on monomers charged. It was water-white, had a refractive index $n_D^{20}$ of 1.5108, and Gardner-Holdt viscosity Z–5.

*Example 5*

One hundred parts of butadiene by weight were dissolved in 31 parts isopropanol by weight with 1.5 parts para-methane hydroperoxide and the mixture was heated 3 hours at 118° C. in a stainless steel tube. The polymer was recovered by stripping the reaction mixture in a film-stripper and the polymer yield was 35% based on monomers charged and the Gardner-Holdt viscosity of the polymer was Z–6.

*Example 6*

To an aluminum lined 5-gallon agitated pressure reactor containing 2800 grams of isopropanol and 2400 grams of a 30.4% solution of cumene hydroperoxide in cumene, 3800 grams of butadiene and 200 grams of isano oil are added, and polymerization thereof for 3 hours at 130° C. produces a liquid polymer in over 65% yield which has a viscosity under 500 poises and has more rapid air drying characteristics than a similar polybutadiene prepared without the isano oil.

*Example 7*

To the aluminum lined reactor was charged 1745 grams of isopropanol and 965 grams of a partially peroxidized tung oil. This solution showed a peroxide content of 1.39%, measured as $H_2O_2$. 5400 grams butadiene was added. Polymerization for 2 hours at 130° C. under agitation followed by vacuum stripping gave a yield of 2290 grams of liquid polymer.

*Example 8*

Example 5 was repeated at 140° C. A 50% yield of polymer was obtained based on monomers charged and the liquid polymer had a Gardner-Holdt viscosity of Z–6.

The butadiene employed in the foregoing examples may be replaced by other diene monomers containing and polymerizable through conjugated diene groups and having from 4 to 8 carbon atoms, as hereinbefore set forth.

These conjugated diene monomers may be employed individually or in combination of two or more thereof. Also, these diene monomers and combinations thereof may be employed in combination with co-monomer materials containing and co-polymerizable through ethylenic groups and preferably having from 2 to 18 carbon atoms as hereinbefore set forth.

The organic peroxy catalysts employed in the foregoing examples may be replaced in whole or in part by other organic hydroperoxide and/or peroxide free radical generating catalysts, as hereinbefore set forth.

The alcohols employed in the foregoing examples in the preparation of the liquid polymers may be replaced by any alcohols containing from 1 to 6 carbon atoms, as hereinbefore set forth, per se, or in combinations, as in azeotropic mixtures in which the alcohol predominates.

The preferred amounts of the $C_1$ to $C_4$ alcohols used for control of reaction time and polymer molecular weight are in the range of 10 to 50 parts by weight, or more, of alcohol per 100 parts by weight of monomers. The economic advantage of short reaction times made possible by the present invention is enhanced by the low percent of diene thermal dimer formation encountered.

The polymer products of the present process are unique, particularly the homopolymers and copolymers of two or more dienic hydrocarbon monomers, in that they contain small amounts of oxygen presumably derived from the catalyst and the alcohol which we believe to function in this invention as a transfer agent. These oxygen containing groups in the polymers apparently contribute to the adhesive properties of the polymers.

While there have been described herein what are at present considered preferred embodiments of the invention it will be obvious to those skilled in the art that minor modifications and changes may be made without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

We claim:
1. A process for forming an unsaturated liquid polymer which comprises
(a) forming a homogenous reaction mixture consisting essentially of, by weight,
  (1) 100 parts polymerizable ethylenically unsaturated monomer material,
  (2) 10 to 200 parts alcohol and
  (3) 0.5 to 10 parts organic peroxy polymerization catalyst containing not more than 30 carbon atoms and having a formula selected from the group consisting of R'OOR' and R'OOH wherein R' is a hydrocarbon radical,
(b) heating said mixture
  (1) at a temperature in the range of from above 100 to 200° C.
  (2) for from 10 minutes to 10 hours,
  (3) to a conversion of the monomer material to polymer of at least 35% and
(c) recovering the formed liquid polymer;
(d) said ethylenically unsaturated monomer material comprising by weight at least 10% conjugated diene monomer containing from 4 to 8 carbon atoms, and
(e) said alcohol containing from 1 to 6 carbon atoms.

2. A process according to claim 1, wherein said ethylenically unsaturated monomer material comprises, by weight, at least 30% conjugated diene monomer material.

3. A process according to claim 1, wherein said ethylenically unsaturated monomer material comprises at least 50% by weight conjugated diene monomer material.

4. A process according to claim 1, wherein said ethylenically unsaturated monomer material comprises substantially 100% by weight conjugated diene monomer material.

5. A process according to claim 1, wherein the reaction mixture comprises 25 to 100 parts by weight of alcohol per 100 parts of monomer material.

6. A process according to claim 1, wherein the reaction mixture comprises 30 to 50 parts by weight of alcohol per 100 parts of monomer material.

7. A process according to claim 1, wherein said alcohol is a primary alcohol.

8. A process according to claim 7, wherein said alcohol is methanol.

9. A process according to claim 1, wherein said alcohol is a secondary alcohol.

10. A process according to claim 9, wherein said alcohol is isopropanol.

11. A process according to claim 1, wherein said alcohol is a tertiary alcohol.

12. A process according to claim 11, wherein said alcohol is tertiary butanol.

13. A process according to claim 1, wherein the homogenous reaction mixture is continuously formed and fed through a polymerization zone, and wherein the formed liquid polymer is continuously removed from said zone.

14. A process according to claim 1, in which a part of the ethylenically unsaturated monomer material is first charged to the reaction mixture and after partial polymerization thereof the remainder of said monomer material is charged.

15. A process according to claim 1, in which the ethylenically unsaturated monomer material comprises conjugated diene monomer material and mono-ethylenically unsaturated monomer material and in which said monomer material is charged in a plurality of steps with partial polymerization therebetween, and in which at least a part of said conjugated diene monomer material is charged in the first of said steps.

16. A process according to claim 15, in which only conjugated diene monomer material is charged in the first of said steps.

References Cited
UNITED STATES PATENTS

| | | | |
|---|---|---|---|
| 2,118,864 | 5/1938 | Reppe et al. | 260—86.1 |
| 2,377,752 | 6/1945 | Britton et al. | 260—94.2 X |
| 2,551,641 | 5/1951 | Seger et al. | 260—680 X |
| 2,586,594 | 2/1952 | Arundale et al. | 260—680 |
| 2,795,618 | 6/1957 | Emerson et al. | 260—610 |
| 2,818,437 | 12/1957 | Wildi et al. | 260—610 |
| 2,937,129 | 5/1960 | Garwood | 260—683.15 X |
| 3,230,235 | 1/1966 | Moore et al. | 260—340.3 |

DELBERT E. GANTZ, *Primary Examiner.*

R. H. SHUBERT, *Assistant Examiner.*